(12) United States Patent
Brees (10) Patent No.: US 8,387,765 B2
(45) Date of Patent: Mar. 5, 2013

(54) RADIAL RATCHET ONE-WAY CLUTCH

(75) Inventor: William Brees, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 543 days.

(21) Appl. No.: 12/637,221

(22) Filed: Dec. 14, 2009

(65) Prior Publication Data

US 2010/0155188 A1 Jun. 24, 2010

Related U.S. Application Data

(60) Provisional application No. 61/203,069, filed on Dec. 18, 2008.

(51) Int. Cl.
*F16D 41/18* (2006.01)

(52) U.S. Cl. ........................................ 192/46; 192/41 R (58) Field of Classification Search .................... 192/46; 60/345, 346; 188/82.7, 82.77; 74/578
See application file for complete search history.

(56) References Cited

U.S. PATENT DOCUMENTS

| | | | | |
|---|---|---|---|---|
| 1,075,311 A | * | 10/1913 | Beck | 74/578 |
| 2,276,913 A | * | 3/1942 | Ashworth | 74/578 |
| 3,814,223 A | * | 6/1974 | Toulier | 192/46 |
| 6,553,758 B2 | | 4/2003 | Reinhart et al. | |
| 6,575,275 B2 | * | 6/2003 | Muramatsu et al. | 192/46 |
| 6,745,881 B1 | * | 6/2004 | Kremer | 192/46 |
| 6,889,808 B2 | | 5/2005 | Robuck | |
| 7,121,394 B2 | | 10/2006 | Chen | |
| 7,383,930 B2 | | 6/2008 | Kimes et al. | |
| 2008/0196990 A1 | | 8/2008 | Cali et al. | |

* cited by examiner

*Primary Examiner* — Rodney Bonck
(74) *Attorney, Agent, or Firm* — Simpson & Simpson, PLLC (57) ABSTRACT

A radial ratchet one-way clutch, including: at least one inner race having a plurality of indentations on an outer circumferential surface; at least one outer race having a plurality of indentations on an inner circumferential surface; and a plurality of engagement elements having respective first segments. The engagement elements are assembled with a bias so that the first segments are urged against the inner race. For rotation of the outer race in a locking direction, respective first segments for at least a portion of the engagement elements are engageable with respective indentations from the pluralities of indentations to rotationally lock the inner and outer races. For rotation of the outer race in a free-wheel direction, opposite the locking direction, the respective first segments are slidable across the outer circumferential surface to enable independent rotation of the outer race with respect to the at least one inner race.

10 Claims, 6 Drawing Sheets

RADIAL RATCHET ONE-WAY CLUTCH

CROSS-REFERENCE TO RELATED APPLICATIONS

This application claims the benefit under 35 U.S.C. §119 (e) of U.S. Provisional Application No. 61/203,069 filed on Dec. 18, 2008 which application is incorporated herein by reference.

FIELD OF THE INVENTION

The invention relates to one-way clutches, and in particular, to a radially-acting one-way clutch.

BACKGROUND OF THE INVENTION

Radially acting one-way clutches are known; however, these clutches use multi-component elements for performing the locking function.

BRIEF SUMMARY OF THE INVENTION

The present invention broadly comprises a radial ratchet one-way clutch, including: at least one inner race having a first plurality of indentations on an outer circumferential surface; at least one outer race disposed radially outside of the at least one inner race and having a second plurality of indentations on an inner circumferential surface; and a first plurality of engagement elements having respective first segments. The first plurality of engagement elements is assembled with a bias so that the respective first segments are urged against the at least one inner race. For rotation of the at least one outer race in a locking direction, respective first segments for at least a portion of the first plurality of engagement elements are engageable with respective indentations from the first and second pluralities of indentations to rotationally lock the at least one inner and outer races. For rotation of the at least one outer race in a free-wheel direction, opposite the locking direction, the respective first segments are slidable across the outer circumferential surface to enable independent rotation of the at least one outer race with respect to the at least one inner race.

In one embodiment, the first plurality of engagement elements includes mutually exclusive second and third pluralities of engagement elements and for rotation of the at least one outer race in the locking direction, respective first segments for only one of the second or third pluralities of engagement elements engage respective indentations from the first and second pluralities of indentations to rotationally lock the at least one inner and outer races. In another embodiment, the clutch includes a longitudinal axis. Respective adjacent indentations in the first plurality of indentations are circumferentially separated by a radial angle with respect to the longitudinal axis, and when shifting from the free-wheel direction to the locking direction to rotationally lock the at least one inner and outer races, the rotation of the at least one outer races is always less than the radial angle. In a further embodiment, the first plurality of indentations includes a larger number of indentations than the second plurality of indentations.

In one embodiment, the at least one inner race includes first and second inner races and the at least one outer race includes a middle race and first and second outside races axially disposed on opposite sides of the middle race, respectively. In another embodiment, the respective first segments are at a first end of each engagement element in the first plurality of engagement elements, each engagement element includes a respective second segment at a second end opposite the first end, the middle plate includes a plurality of openings, the respective second segment is at least partially disposed in a respective opening in the plurality of openings and is circumferentially restrained by the middle plate, and the second plurality of indentations is disposed on the first and second outside plates.

In one embodiment, each engagement element includes a respective flex segment connecting the respective first and second segments, for rotation of the at least one outer race in the locking direction, only one of the second or third pluralities of engagement elements is displaceable with respect to the middle plate to decrease a length of the respective flex segments disposed radially inward of the at least one outer race to increase a force with which the respective first segments in said only one of the second or third pluralities of engagement elements are urged against the at least one inner race, or for rotation of the at least one outer race in the free-wheel direction, the first plurality of engagement elements are displaceable with respect to the middle plate to increase a length of the respective flex segments disposed radially inward of the at least one outer race to decrease a force with which the respective first segments.

The present invention also broadly comprises a radial ratchet one-way clutch, including: at least one inner race having a first plurality of indentations on an outer circumferential surface; at least one outer race disposed radially outside of the at least one inner race and having a second plurality of indentations on an outer circumferential; and first and second pluralities of engagement elements having respective first segments. For rotation of the at least one outer race in a locking direction, respective first segments for only one of the first or second pluralities of engagement elements engage respective indentations from the first and second pluralities of indentations to rotationally lock the at least one inner and outer races. For rotation of the at least one outer race in a free-wheel direction, opposite the locking direction, the respective first segments are slidable across the outer circumferential surface to enable independent rotation of the at least one inner and outer races.

It is a general object of the present invention to provide a radially-acting one-way clutch.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
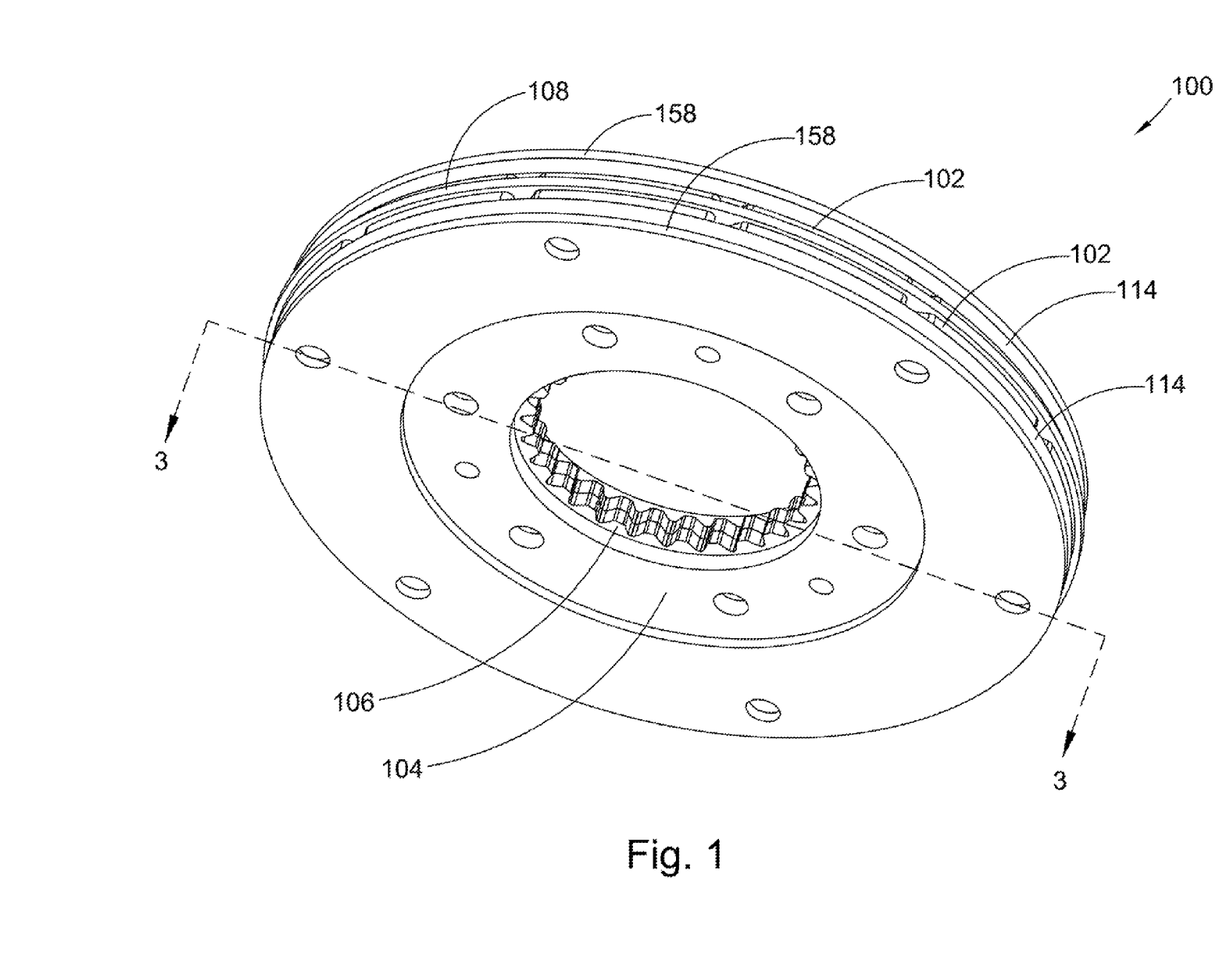
FIG. 1 is a perspective view of a present invention radial ratchet one-way clutch.

FIG. 1 is a perspective view of present invention radial ratchet one-way clutch (OWC) 100.

Figure 2:
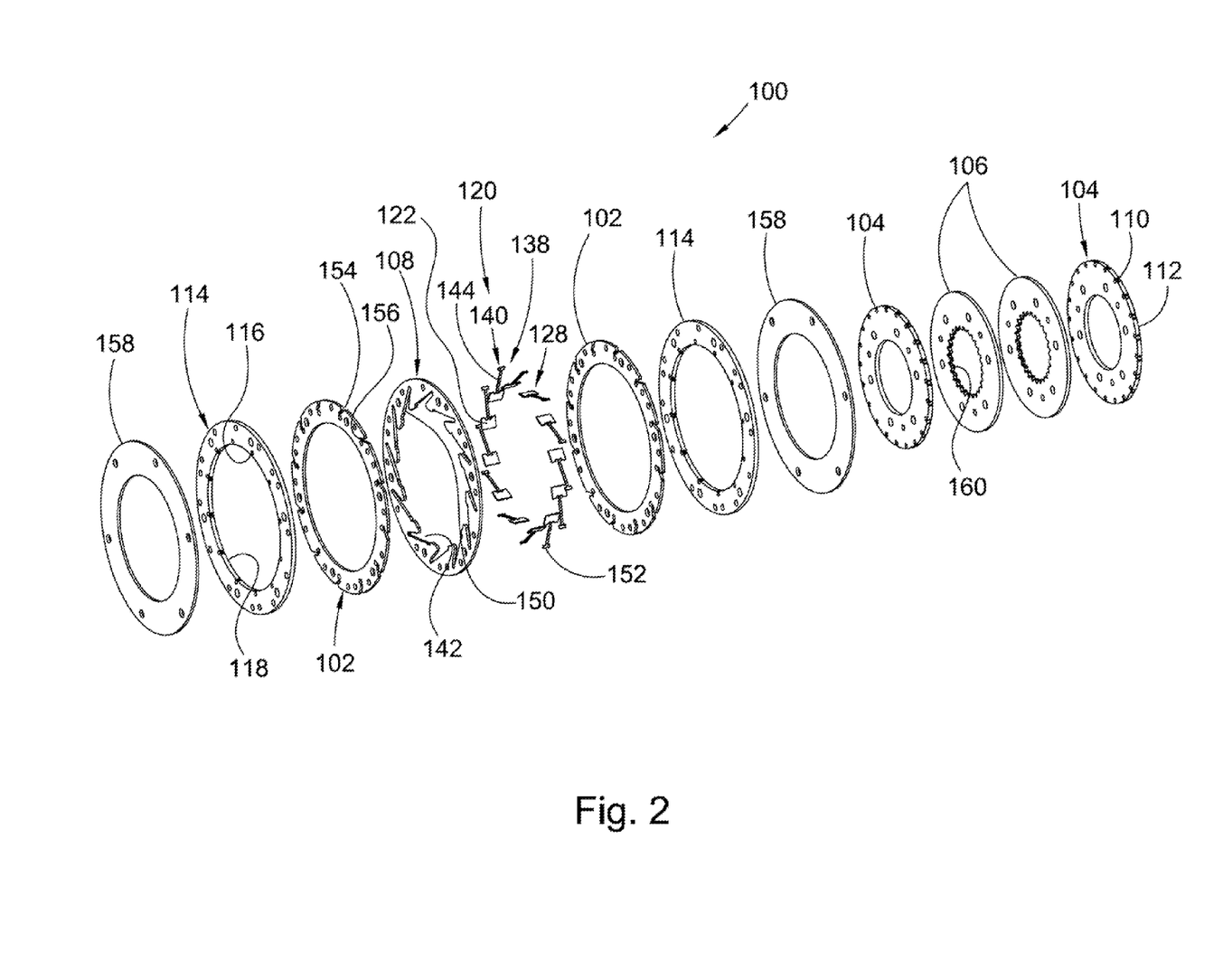
FIG. 2 is an exploded view of the present invention radial ratchet one-way clutch shown in FIG. 1.

FIG. 2 is an exploded view of one-way clutch (OWC) 100 shown in FIG. 1.

Figure 3:
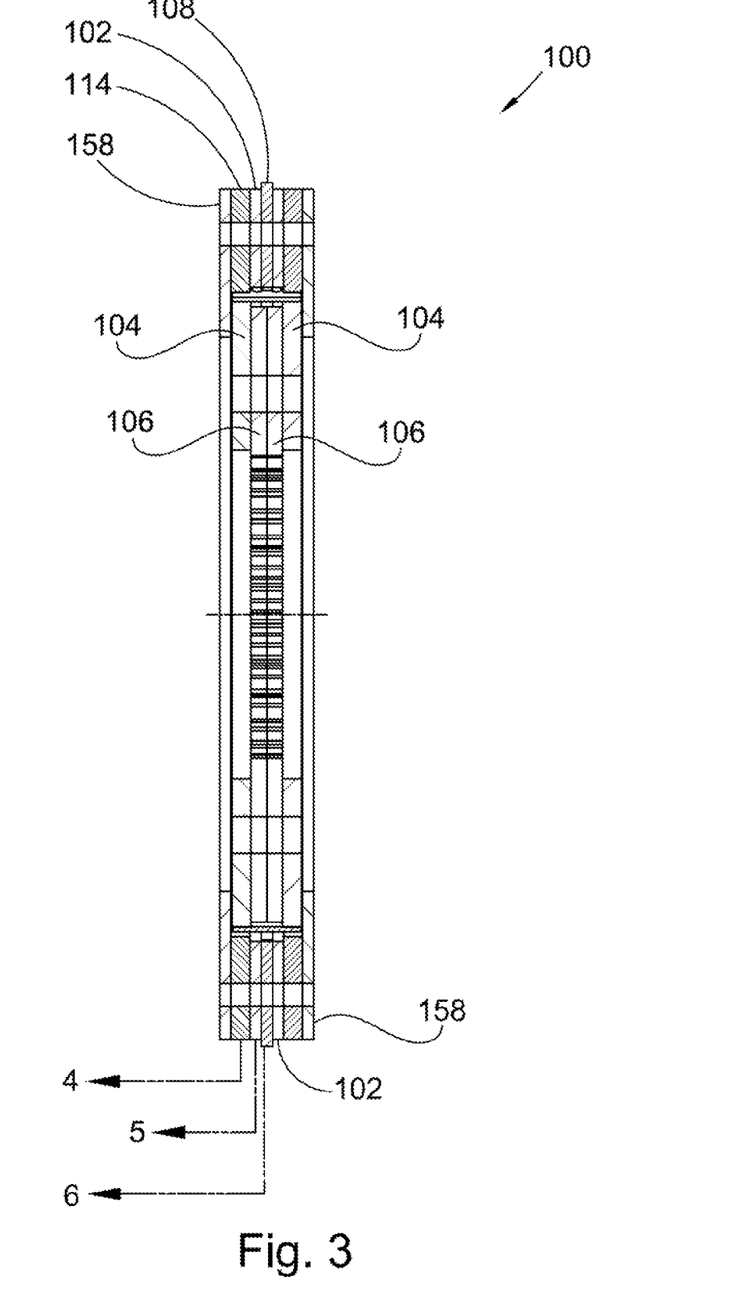
FIG. 3 is a cross-sectional view of the one-way clutch shown in FIG. 1 generally with respect to line 3-3 in FIG. 1.

FIG. 3 is a cross-sectional view of one-way clutch 100 shown in FIG. 1 generally with respect to line 3-3 in FIG. 1.

Figure 4:
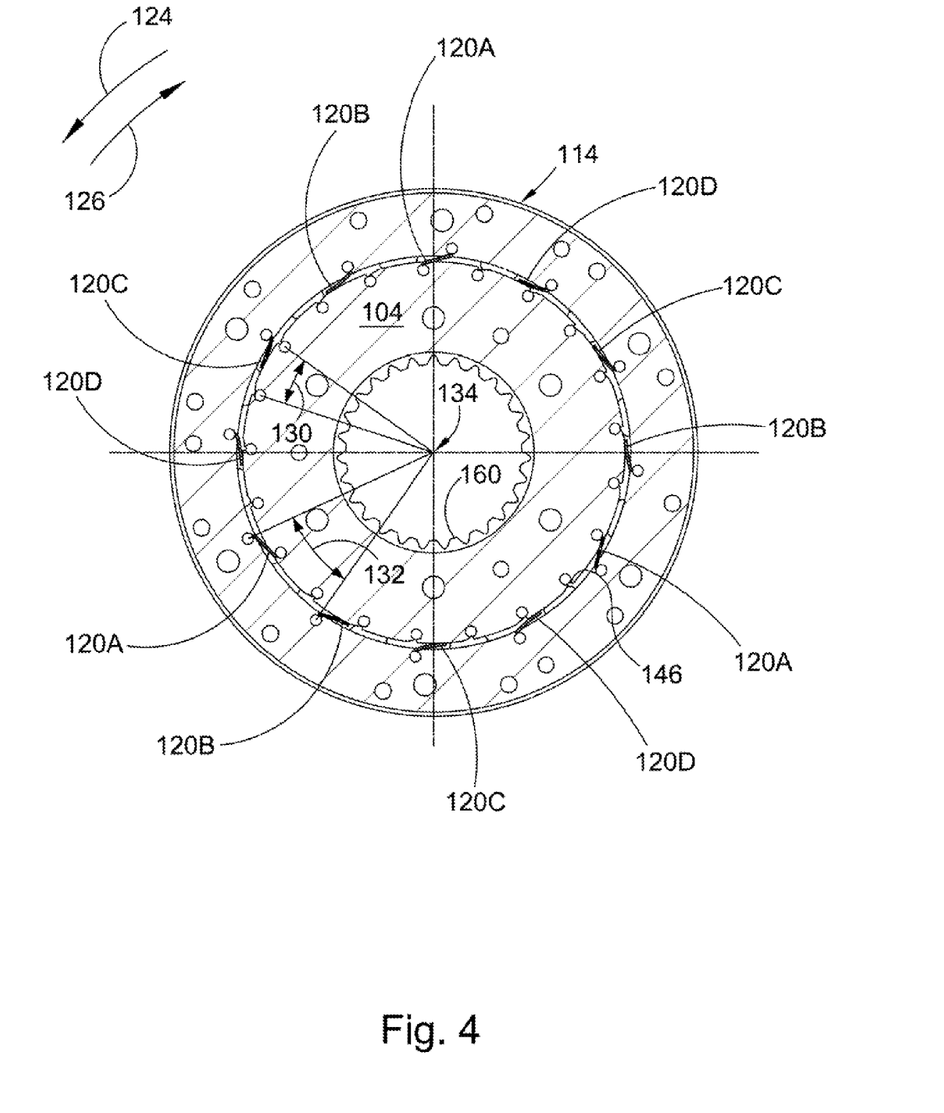
FIG. 4 is a cross-sectional view of the one-way clutch shown in FIG. 1 through an outside plate and an outside inner race.

FIG. 4 is a cross-sectional view of one-way clutch 100 shown in FIG. 1 through outside plate 114 and outside inner race 104.

Figure 5:
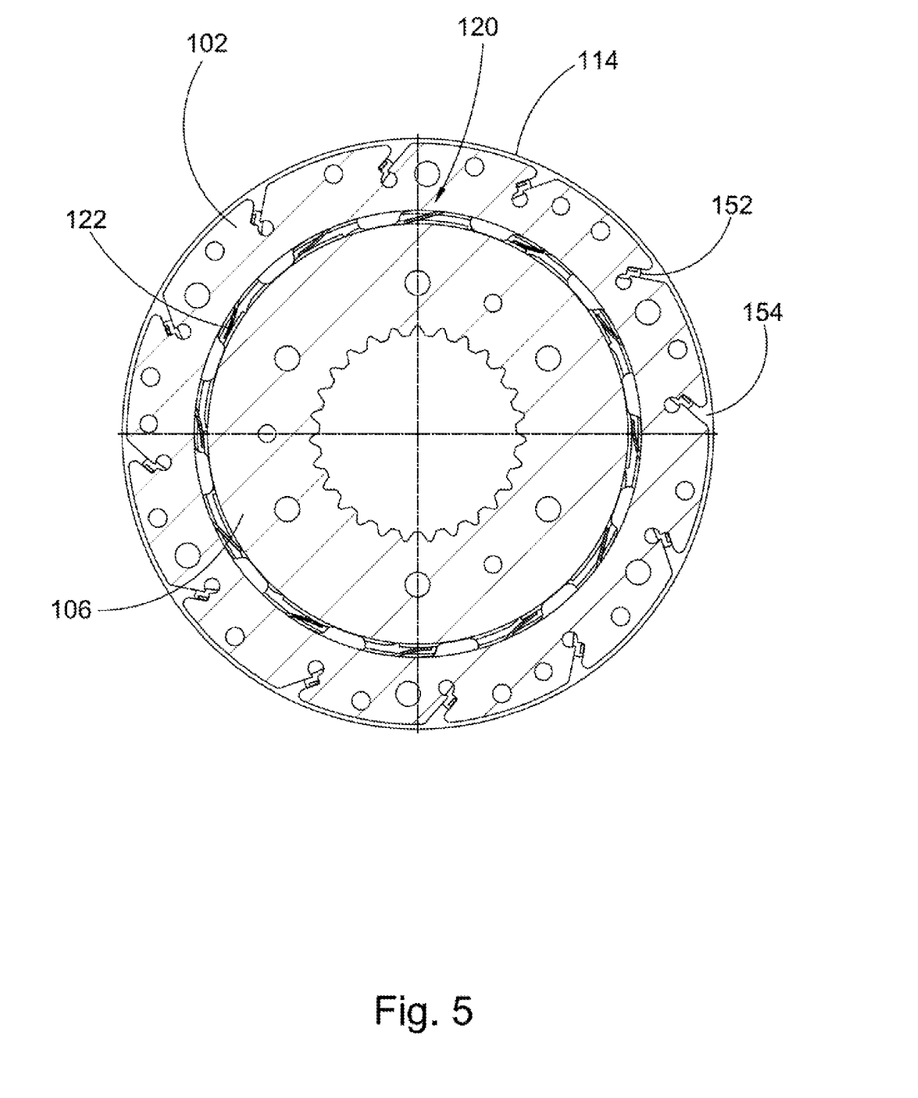
FIG. 5 is a cross-sectional view of the one-way clutch shown in FIG. 1 through a sandwich plate and an inside inner race; and, FIG. 6 is a cross-sectional view of the one-way clutch shown in FIG. 1 through the middle outside race and an inside inner race.
Figure 6:
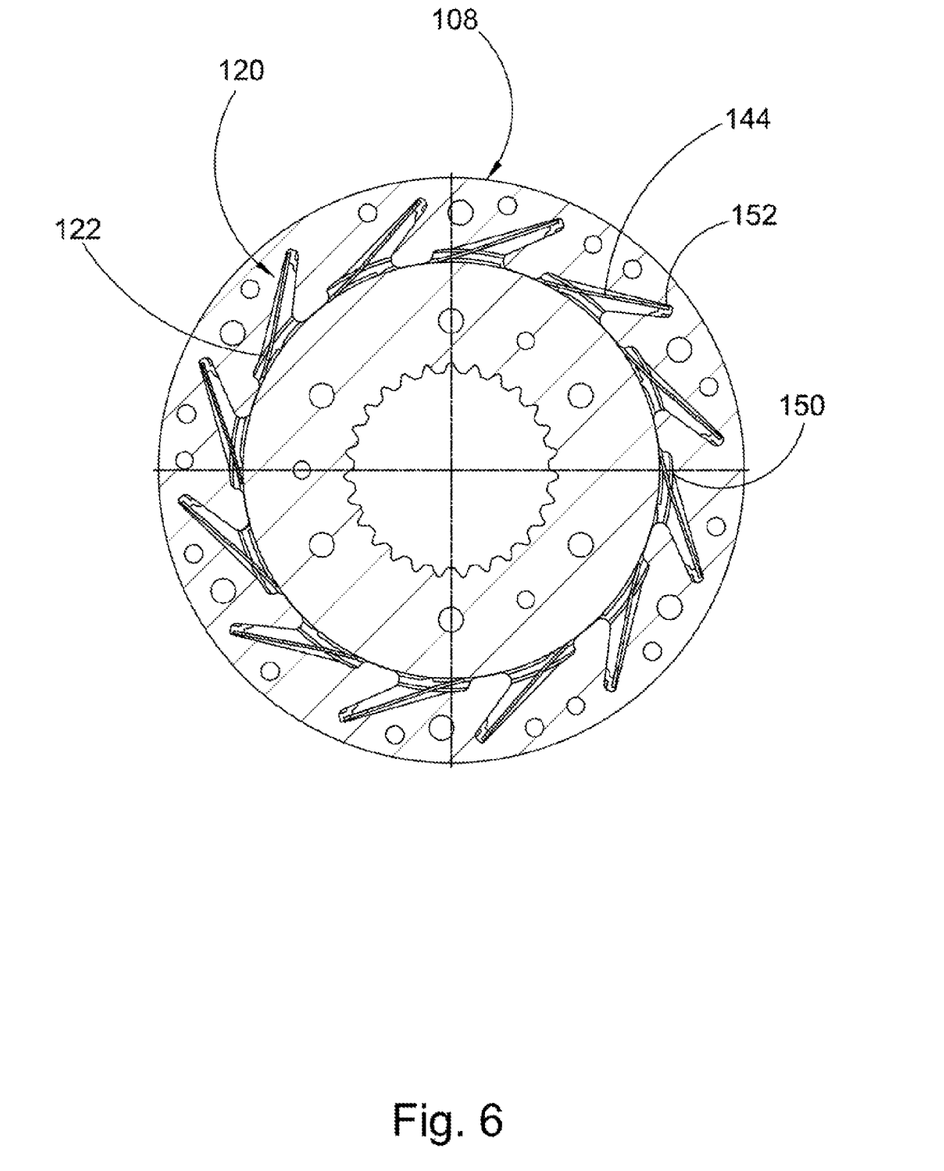

FIG. 5 is a cross-sectional view of one-way clutch 100 shown in FIG. 1 through sandwich plate 102 and an inside inner race 106; and, FIG. 6 is a cross-sectional view of one-way clutch 100 shown in FIG. 1 through the middle outside race 108 and an inside inner race. The following should be viewed in light of FIGS. 1 through 6. The OWC includes at least one inner race, for example, inside inner races 106 and outside inner races 104, having a plurality of indentations, for example, indentations 110, on an outer circumferential surface, for example, surface 112. The OWC also includes at least one outer race, for example, middle race 108, sandwich plates 102, and outside plates 114. The outer races are disposed radially outside of the inner races and have a plurality of indentations, for example, indentations 116 on an inner circumferential surface, for example, surface 118. The OWC includes a plurality of engagement elements, for example, elements 120, having respective first segments, for example, segments 122. The engagement elements are assembled with a bias so that segment 122 is urged against the inner races, for example, against races 110, and more particularly, against surface 112.

In one embodiment, for rotationally fixed inner races and for rotation of the outer race with respect to the inner races in a locking direction, for example, direction 124, respective segments 122 for at least a portion of the engagement elements are engageable with respective indentations from indentations 110 and 116 to rotationally lock the inner and outer races. That is, the inner and outer races are forced to rotate together due to the connection formed by the engagement elements.

For rotation of the outer race with respect to the inner races in a free-wheel direction, for example, direction 126, opposite the locking direction, segments 122 are slidable across circumferential surface 112 to enable independent rotation of the outer races with respect to the one inner races. That is, ends 128 of the engaging elements slide along the inner races, for example, along surface 112, without fixedly engaging with indentations 110.

In one embodiment, the engagement elements are divided among two or more, mutually exclusive groupings, or pluralities, and for rotation of the outer races in the locking direction, respective engagement segments for only one of the two or more groupings engage respective indentations 110 and 116 to rotationally lock the inner and outer races. Thus, only some of the engagement elements lock with the inner and outer races at any one time. For example, engagement elements 120A in FIG. 4 are lockingly engaged with the inner and outer races. In another embodiment, the number of indentations 110 is greater than the number of indentations 116, for example, in the figures, there are 12 indentations 116 and 21 indentations 110. In the figures, engagement elements 120 are organized into four groups of three: 120A; 120B; 120C; and 120D, only one of which is locked with the inner and outer races during any one locking event. It should be understood that any sequence of groups 120A; 120B; 120C; and 120D can be associated with sequential transitions between the free-wheeling and locking modes.

In one embodiment, the number of indentations 110 is greater than the number of indentations 116 and indentations 110 and 116 are evenly spaced about surfaces 112 and 118, respectively. Adjacent indentations 110 and 116 are separated by angles 130 and 132, respectively, measured with respect to longitudinal axis 134. Angle 130 is less than angle 132 since there are more indentations 110 than indentations 116. The number and spacing of indentations 110 are determined to enable the separate engagements of groups 120A-D, which reduces the amount of lash associated with a shift from the free wheel mode to the locking mode for clutch 100. For example, when shifting from the free-wheel direction to locking of the inner and outer races in the locking direction, for example, when elements 120A engage the inner and outer races, the rotation of the outer races is always less than radial angle 132 and no greater than angle 130. That is, the maximum lash associated with a shift from free-wheel mode to locking mode is advantageously limited by angle 130, rather than angle 132.

For example, as described infra, each engagement element is associated with an indentation; hence, with respect to indentations 116 and angle 132, the lash could be as large as angle 132. However, the engagement elements are not associated with specific indentations 110 and are free to engage any of indentations 110 depending on the rotation of the outer races.

Therefore, if angle 130 is less than angle 132, the maximum distance the outer race can rotate when switching to the locking mode is defined by angle 130. However, due to the number and spacing of indentations, the amount of lash can be limited to substantially less than angle 130. For example, as shown in FIG. 4, at any one time, various of the engagement elements are disposed at different respective distances from indentation 110, all of which have angles, with respect to the axis, less than angle 130.

Each indentation 116 is associated with an engagement element, and more fabricating steps are needed to make the outer races due to the configuration needed to house the engagement elements. However, the indentations 110 are very simply formed. Therefore, the cost and complexity for minimizing lash associated with clutch 100 is advantageously reduced by increasing the number of indentations 110, rather than increasing the number of engagement elements.

Segments 122 are at end 128 of each engagement element and each engagement element includes segment 138 at end 140, opposite end 128. In one embodiment, middle plate 108 includes plurality 142 of slots, segments 138 are at least partially disposed in openings 142 and are circumferentially restrained by the middle plate. In another embodiment, the engagement elements includes flex segments 144 connecting segments 122 and 138. At least segments 144 of the engagement elements include the bias noted supra, That is, at least segments 144 are assembled to be biased in one direction. In one embodiment, during rotation of the outer race in the locking direction, ends 128 for the engagement elements for one of groups 120A-D, for example, group 120A, contact edges of respective indentations 110, for example, edges 146, which locks the elements and the edges. As the outer race continues to rotate, the engagement elements are prevented from moving in direction 124 and are pushed up (radially outward) into slots 142. This movement decreases the length of the portion of segments 144 disposed radially inward of the outer races, for example, extending radially inward from surface 118, increasing the force, due to the biasing of the engagement elements, with which segments 128 are urged against the inner race. For example, due to the biasing of the engagement elements, the shorter the distance of ends 128 from the point at which the engagement elements react against race 108, for example, at points 150, the greater the force with which segments 122 are urged against races 104, advantageously increasing the locking of segments 122 with races 104.

In one embodiment, extensions 152 of segments 138 are disposed in slots 154 of races 102. For rotation of the outer races in the free-wheel direction, the engagement elements are displaceable with respect to the outer races to increase length 144 of the flex segments disposed radially inward of the outer races to decrease a force with which segments 122 are urged against the inner races. For example, frictional contact between segments 122 and the inner races draws the engagement elements radially inward within slots 142 and 154 until extensions 152 contact races 102, for example, at ends 156 of slots 154. This movement increases the length of the portion of segments 144 disposed radially inward of the outer races, for example, extending radially inward from surface 118, decreasing the force, due to the biasing of the engagement elements, with which segments 122 are urged against the inner race. For example, due to the biasing of the engagement elements, the longer the distance of ends 128 from the point at which the engagement elements react against race 108, for example, at points 150, the less the force with which segments 122 are urged against races 104, advantageously decreasing drag between segments 122 and races 104.

In one embodiment, clutch 100 includes end plates 158. In another embodiment, races 106 include mating elements 160, for example, splines or a tooth arrangement, for engagement with a shaft. In a further embodiment, the engagement is for a rotationally fixed shaft.

In one embodiment, the components of clutch 100 shown in the figures are formed by a stamping process. Although a specific size, shape, number, and configuration of races, plates, and engagement elements are shown in the figures, it should be understood that other sizes, shapes, numbers, and configurations of races, plates, and engagement elements are within the spirit and scope of the claimed invention.

Although a present invention clutch has been described with rotatable outer races and rotationally fixed inner races, it should be understood that a present invention OWC is not limited to this configuration. For example, both the outer and inner races can be rotatable, and rotation in the locking and free wheel directions can be with respect to relative rotation between the outer races. For example, rotation in the locking and free wheel directions would be by the outer races with respect to the inner races. Also, the outer races can be fixed and the inner races rotatable. Then rotation in the locking and free wheel modes would be defined by rotation of the inner races. Further, the engagement elements can be disposed within the inner races. For example, the inner races can be configured to include the slots within which the engagement elements are disposed and within which the engagement elements are displaceable. It also should be understood that the locking and free-wheel directions shown can be reversed.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A radial ratchet one-way clutch, comprising:
   at least one inner race having a first plurality of indentations on an outer circumferential surface;
   at least one outer race having a second plurality of indentations on an inner circumferential surface; and,
   a first plurality of engagement elements having respective first segments, wherein the first plurality of engagement elements is assembled with a bias so that the respective first segments are urged against the at least one inner race, wherein for rotation of the at least one outer race in a locking direction, respective first segments for at least a portion of the first plurality of engagement elements are engageable with respective indentations from the first and second pluralities of indentations to rotationally lock the at least one inner and outer races, and wherein:
   for rotation of the at least one outer race in a free-wheel direction, opposite the locking direction, the respective first segments are slidable across the outer circumferential surface to enable independent rotation of the at least one outer race with respect to the at least one inner race;
   the first plurality of engagement elements includes mutually exclusive second and third pluralities of engagement elements;
   for rotation of the at least one outer race in the locking direction, respective first segments for only one of the second or third pluralities of engagement elements engage respective indentations from the first and second pluralities of indentations to rotationally lock the at least one inner and outer races;
   the at least one inner race includes first and second inner races;
   the at least one outer race includes a middle race and first and second outside races axially disposed on opposite sides of the middle race, respectively;
   each engagement element in the first plurality of engagement elements includes a first end at which the respective first segments are disposed;

said each engagement element includes a respective second segment at a second end opposite the first end;
the middle race includes a plurality of openings;
the respective second segments are at least partially disposed in respective openings in the plurality of openings and are circumferentially restrained by the middle race; and
the second plurality of indentations is disposed on the first and second outside races.

2. The radial ratchet one-way clutch of claim 1 further comprising a longitudinal axis, wherein respective adjacent indentations in the first plurality of indentations are circumferentially separated by a radial angle with respect to the longitudinal axis, and wherein when shifting from the free-wheel direction to the locking direction to rotationally lock the at least one inner and outer races, the rotation of the at least one outer races is less than the radial angle.

3. The radial ratchet one-way clutch of claim 1 wherein the first plurality of indentations includes a larger number of indentations than the second plurality of indentations.

4. The radial ratchet one-way clutch of claim 1 wherein said each engagement element includes a respective flex segment connecting the respective first and second segments, wherein for rotation of the at least one outer race in the locking direction, wherein the first plurality of engagement elements is displaceable with respect to the middle race to decrease a length of the respective flex segments disposed radially inward of the at least one outer race to increase a force with which the respective first segments in first plurality of engagement elements are urged against the at least one inner race, or wherein for rotation of the at least one outer race in the free-wheel direction, the first plurality of engagement elements are displaceable with respect to the middle race to increase a length of the respective flex segments disposed radially inward of the at least one outer race to decrease a force with which the respective first segments are urged against the at least one inner race.

5. A radial ratchet one-way clutch, comprising:
at least one inner race having a first plurality of indentations on an outer circumferential surface;
at least one outer race:
disposed radially outside of the at least one inner race and having a second plurality of indentations on an outer circumferential surface; and
including a middle race; and,
first and second pluralities of engagement elements having respective first segments, wherein:
for rotation of the at least one outer race in a locking direction, respective first segments for only one of the first or second pluralities of engagement elements engage respective indentations from the first and second pluralities of indentations to rotationally lock the at least one inner and outer races;
for rotation of the at least one outer race in a free-wheel direction, opposite the locking direction, the respective first segments are slidable across the outer circumferential surface to enable independent rotation of the at least one inner and outer races;
the respective first segments are at a first end of each engagement element in the first and second pluralities of engagement elements;
said each engagement element includes a respective second segment at a second end opposite the first end;
the middle race includes a plurality of openings;
the respective second segment is at least partially disposed in a respective opening in the plurality of openings and is circumferentially restrained by the middle race, and
the second plurality of indentations is disposed on the at least one outer race.

6. The radial ratchet one-way clutch of claim 5 wherein each engagement element in the first and second plurality of engagement elements is assembled with a bias so that the respective first segments are urged against the at least one inner race.

7. The radial ratchet one-way clutch of claim 5 further comprising a longitudinal axis, wherein respective adjacent indentations in the second plurality of indentations are circumferentially separated by a radial angle with respect to the longitudinal axis, and wherein when shifting from the free-wheel direction to engagement of the respective first segments for only one of the first or second pluralities of engagement elements with the respective indentations from the first and second pluralities of indentations, the relative rotation between the at least one inner and outer races is always less than the radial angle.

8. The radial ratchet one-way clutch of claim 5 wherein the first plurality of indentations includes a larger number of indentations than the second plurality of indentations.

9. The radial ratchet one-way clutch of claim 5 wherein the at least one inner race includes first and second inner races and wherein the at least one outer race includes first and second outside races axially disposed on opposite sides of the middle race, respectively.

10. The radial ratchet one-way clutch of claim 5 wherein said each engagement element includes a respective flex segment, with the bias, connecting the respective first and second segments, wherein for rotation of the at least one outer race in the locking direction, the first and second pluralities of engagement elements are displaceable with respect to the middle race to decrease a length of the respective flex segments disposed radially inward of the at least one outer race to increase a force with which the respective first segments in the first and second pluralities of engagement elements are urged against the at least one inner race, or wherein for rotation of the at least one outer race in the free-wheel direction, the first and second pluralities of engagement elements are displaceable with respect to the middle race to increase a length of the respective flex segments disposed radially inward of the at least one outer race to decrease a force with which the respective first segments are urged against the at least one inner race.

* * * * *